United States Patent [19]

Larsen

[11] Patent Number: 4,476,989

[45] Date of Patent: Oct. 16, 1984

[54] PIZZA BOX CARTON

[76] Inventor: Arthur Larsen, 1 Pitt Pl., Dix Hills, Long Island, N.Y. 11746

[21] Appl. No.: 335,166

[22] Filed: Dec. 28, 1981

[51] Int. Cl.³ .................... B65D 1/24; A45C 11/20
[52] U.S. Cl. .................................... 220/4 E; 206/545
[58] Field of Search .................... 220/4 E; 206/575

[56] References Cited

U.S. PATENT DOCUMENTS

| | | | |
|---|---|---|---|
| 3,346,137 | 10/1967 | Ricci | 220/4 E |
| 3,360,152 | 12/1967 | Leers | 220/4 E |
| 3,908,852 | 9/1975 | Ricobene | 220/4 E |
| 4,014,450 | 3/1977 | Girotti | 220/4 E |
| 4,195,746 | 4/1980 | Cottrell | 220/4 E |

FOREIGN PATENT DOCUMENTS 426706 10/1968 Switzerland .................. 220/4 E

Primary Examiner—George E. Lowrance
Attorney, Agent, or Firm—William J. Eppig

[57] ABSTRACT

A pizza box carton is disclosed wherein identical molded insulation carton halves enclose a conventional takeout pizza box so that the carton is in a tight, non-slidable, interfit relationship so as to prevent the pizza box with a pizza therein from sliding and leaking, while preventing heat loss. The carton halves are of interchangeable design so as to reduce cost and render assembly easy, as well as being reusable. The present construction is useful with other boxed hot or cold items.

5 Claims, 7 Drawing Figures

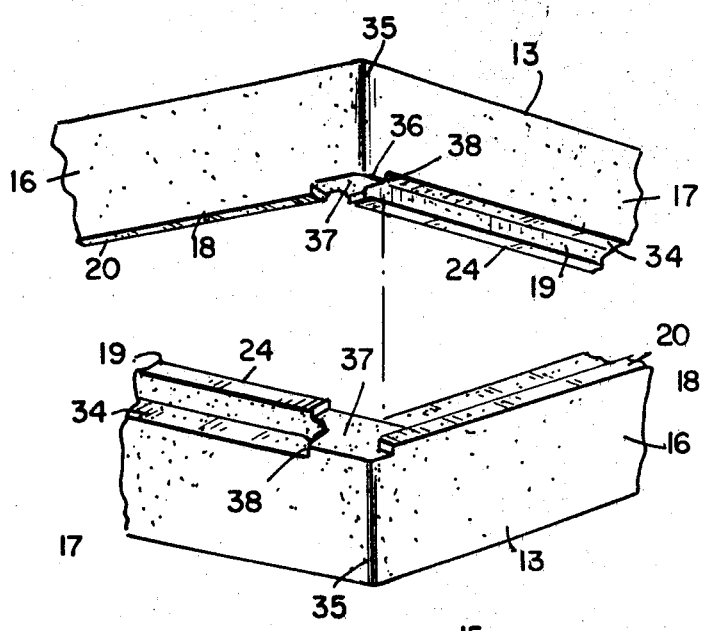
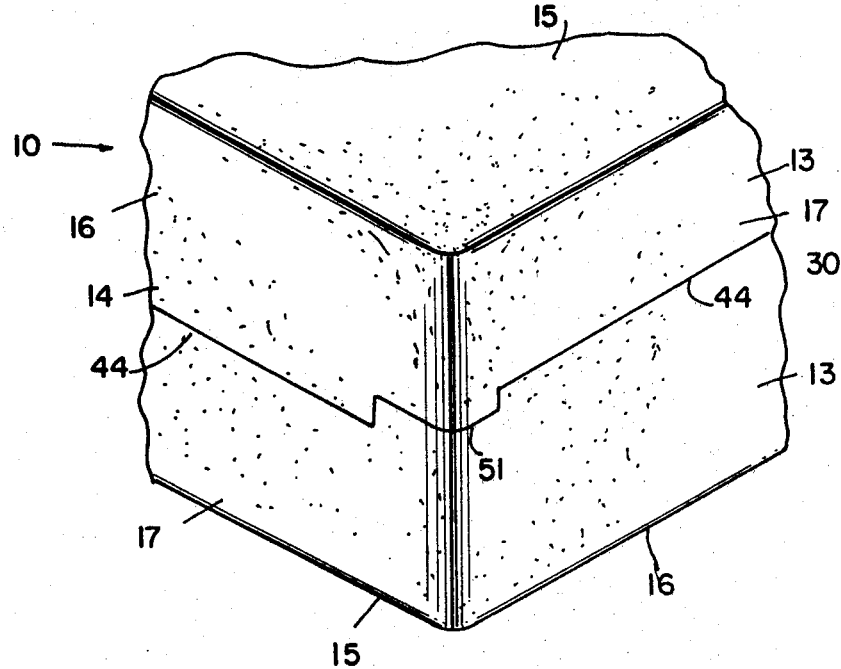

PIZZA BOX CARTON

FIELD OF THE INVENTION

This invention relates to cartons.

BACKGROUND AND DISCUSSION OF PRIOR ART

Heretofore it was known in the art to provide food containers of the slide-in type, such as is disclosed in Nigro, U.S. Pat. No. 3,650,838, Goltsos, U.S. Pat. No. 4,013,798, and Faller, U.S. Pat. No. 4,221,320.

It was also known to provide cartons with somewhat similar tops and bottoms, such as is disclosed in Perkins, U.S. Pat. No. 3,939,928.

In the handling or delivery of pizza in conventional pizza boxes, there was often a difficulty in handling the box without sliding or leakage from the box, as well a facing the problems of loss of heat from the box and condensation within the box.

There is now provided by the present invention a carton which will hold a take-out pizza box in a non-slidable relationship, avoids leakage and condensation, and insulates the hot pizza, and yet is formed of two interchangeable identical molded halves so as to be readily manufactured, assembled and used for its intended purpose.

BRIEF DESCRIPTION OF THE DRAWINGS

FIG. 6 is an exploded, enlarged-scaled view taken at the corner of the carton prior to closure; and FIG. 7 is an enlarged-scale corner view of the closed carton of FIG. 6.

DESCRIPTION OF THE PREFERRED EMBODIMENT

Figure 1:
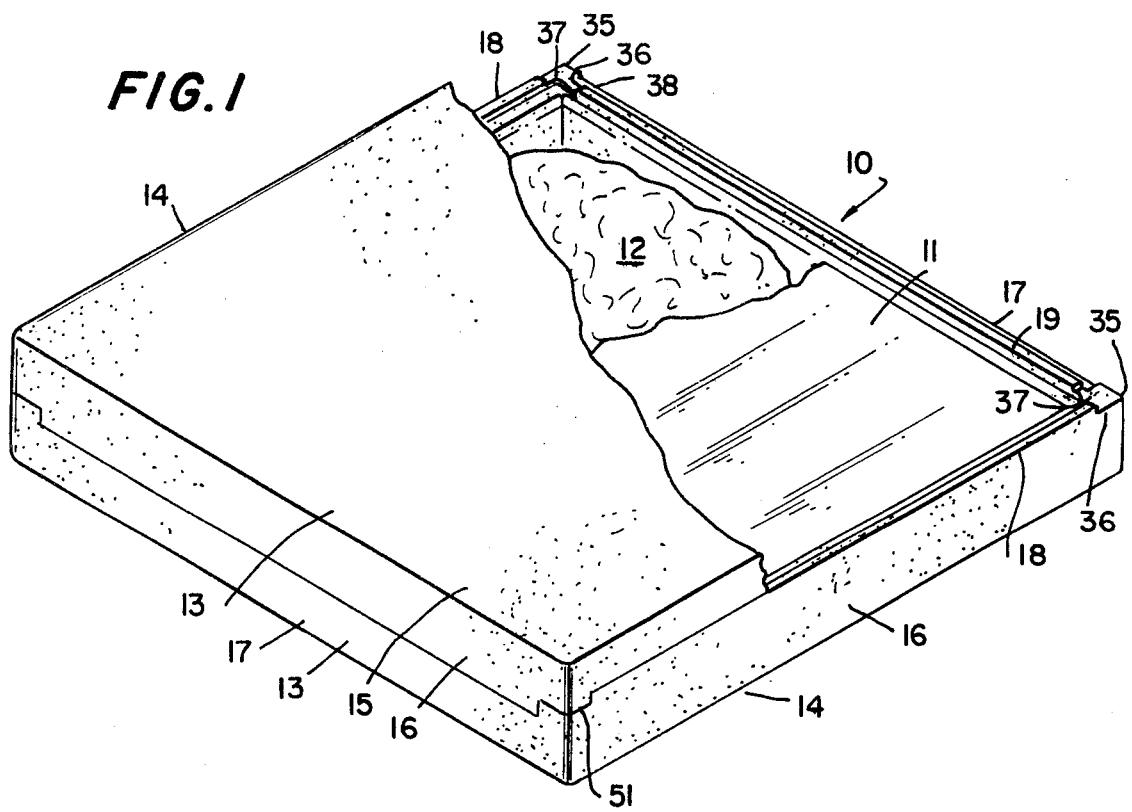
FIG. 1 is a perspective, partial fragmentary view of the carton of the present invention.
Figure 2:
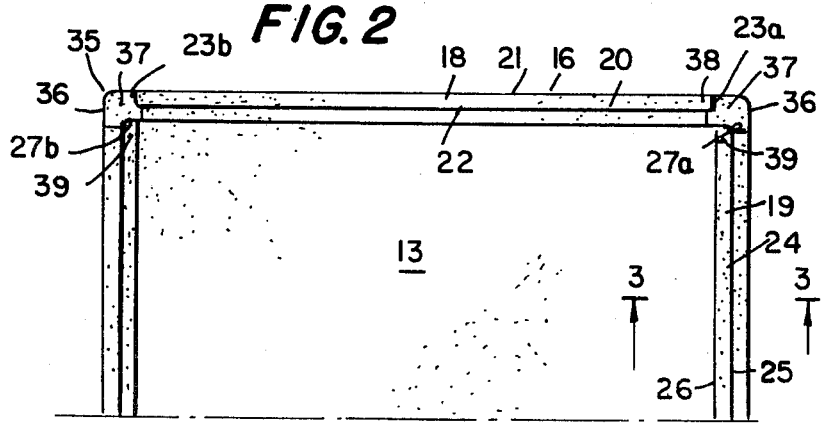
FIG. 2 is a reduced scale plan view of one half of the carton of the present invention.
Figure 3:
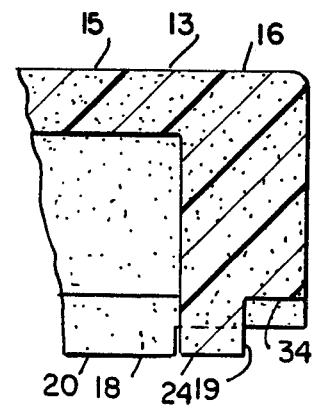
FIG. 3 is a sectional view taken along line 3—3 of FIG. 2, and rotated to the downward facing position for clarity.
Figure 4:
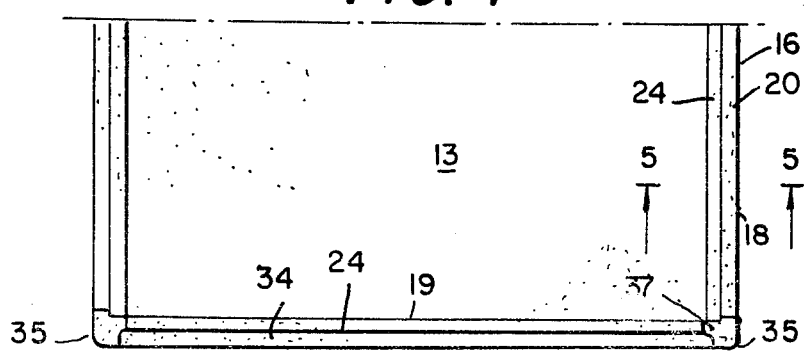
FIG. 4 is a reduced scale plan view of the mating half of the carton as in FIG. 2.
Figure 5:
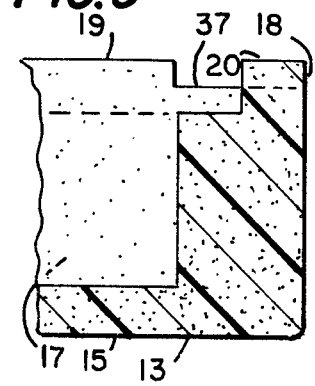
FIG. 5 is a sectional view taken along line 5—5 of FIG. 4.

Referring to FIG. 1, there is shown the carton or container of the present invention generally referred to as 10 for carrying a pizza box 11 containing a pizza 12 for delivery to the intended user. Carton 10 is formed of two identical halves or closure members 13 which interchangeably fit at the side portions 14 so as to provide the fully enclosed carton 10.

Referring now to FIGS. 1-5, each closure member 13 comprises a rectilinear base or top 15 with a first pair of opposed walls 16 and a second pair of opposed walls 17. Each of said walls is formed with lip portion 18 extending upwardly from base 15 and side wall 16, and each of said side wall 17 has a lip portion 19 extending upwardly from base 15 and the side wall 17. Both lip portions 18 and 19 are rectilinear in shape. Face sections 20 of lip portions 18 comprise parallel side walls 21 and 22 and parallel end walls 23a and 23b. Face sections 24 of lip portions 19 comprise parallel walls 25 and 26 and parallel end walls 27a and 27b. It is important to note that face sections 20 are more outwardly disposed than face sections 24.

Member 13 is formed with four corners 35. Each corner 35 is formed with an upwardly-extending lip portion 36 having face portion 37 and inner side walls 38 and 39. In closing the closure member 13 opposing face portions 37 of opposing member 13 abut, with the interfitting of the opposing side wall lip portions 18 and 19. Corner lip portions 36 are about one-half of the height of side wall lip portions 18 and 19.

In closing the box, the mating face portions 37 of the corners 35, and the mating face portions of the interfitting side wall lips form and edge step 51.

In forming carton 10, two members 13 are placed in facing opposition so that protruding face sections 20 of one member are disposed directly above recessed face sections 34 of the other member. Face section 34 of lip 19 is the outside recessed face and face section 34 of lip 18 is the inside recessed portion lip face portion 34 mate with the respective face portion of 20 and 24 of lips 18 and 19, respectively. The halves are then brought together so the respective lip portions 18 and 19 are intergaged and the two lip portions interfit at exterior mating edge 44 so as to provide a tight and flush surface 30 (FIG. 7.).

It is also to be borne in mind that that walls 16, 17 and base 15 are shaped so as to provide squared corners for receiving a box, such as a pizza box, with a snug fit so as to eliminate sliding or jiggling of the box 11.

The closure members may be molded or formed of integral, one-piece foamed polymeric material, such as polyurethane or styrene, so as to provide and insure the necessary insulation, particularly so in combination in the snug or tight fit of the closure members.

By virtue of the identical and interchangeable character of the closure members, each member may be formed from the same mold, and loss or misplacement of any member is readily replaced by another identical member.

Once the pizza box is received within the carton of this invention, a notation can be placed on top to indicate which side is the "up" or "top" side of the carton in relation to the pizza box.

While the aforesaid description was in connection with a pizza box, it is understood that other boxes of food containers are within the contemplating of the present invention.

The terms and expressions which have been employed are used as terms of description and not of limitations and there is no intention of excluding such equivalents as fall within the scope of the claims.

What is claimed is:

1. A carton comprising a pair of interchangeable, opposed, closure members, each of said closure members comprising a rectilinear base and four side walls disposed at the periphery of said base so as to provide a four-cornered construction being formed with central receptable portion, wherein first two of said walls being formed with lip portions and the second two of said walls being formed with other lip portions, said first two walls being oppositely disposed and said second two walls being oppositely disposed, wherein the lip portions of said first two walls are more outwardly disposed than the lip portions of said second two walls, said corners comprise upwardly-extending lip portions, and wherein said corner portions of one member interfit the corner lip portions of the other member, said corner lip portions of opposed closure members being in abutment, and wherein said corner lip portions extend upwardly about one-half the height of the side lip portions; said interfitting side lip portions and said abutting corner lip portions forming a step at the line of closure of the members at each of the side walls of the carton adjacent the corner, and wherein one step is more upwardly disposed than the other step, whereby the two closure members are interfitted with the lip portions of said first walls interengaging the other lip portions of said second two walls of the opposed closure members.

2. The carton of claim 1, said lip portions being formed so as to provide a non-slidable interfit.

3. The carton of claim 2, wherein each of said lip portions comprise a rectilinear face section in a place parallel to the base.

4. The carton of claim 1, said members being formed of molded foamed polymeric material.

5. The carton of claim 4, said central receptacle portion being formed so as to provide squared corners so as to receive a square-cornered box, and whereby half of the box is received in the receptacle portion of one member and the other half of the box is received in the receptacle portion of the other member.

* * * * *